United States Patent Office

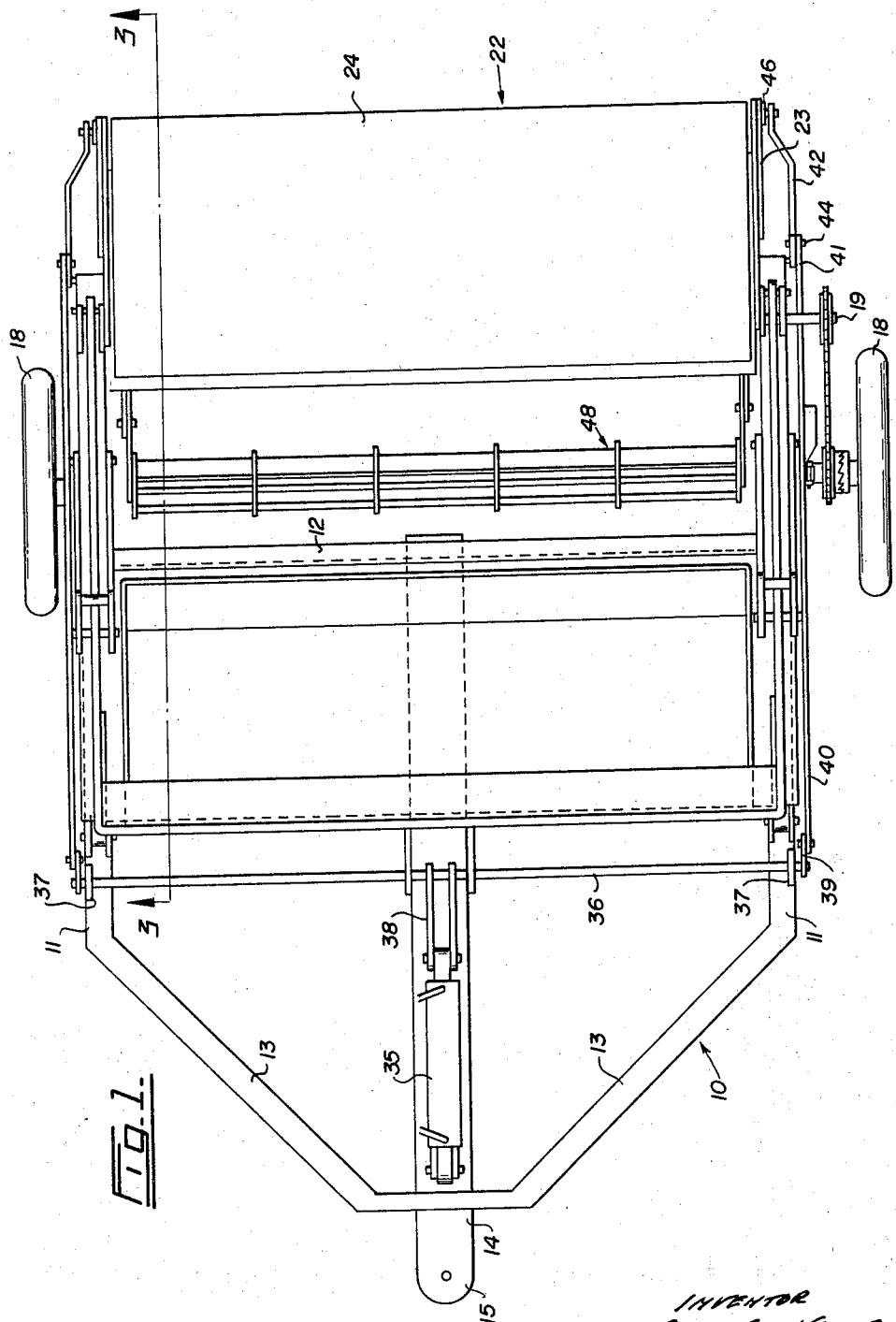

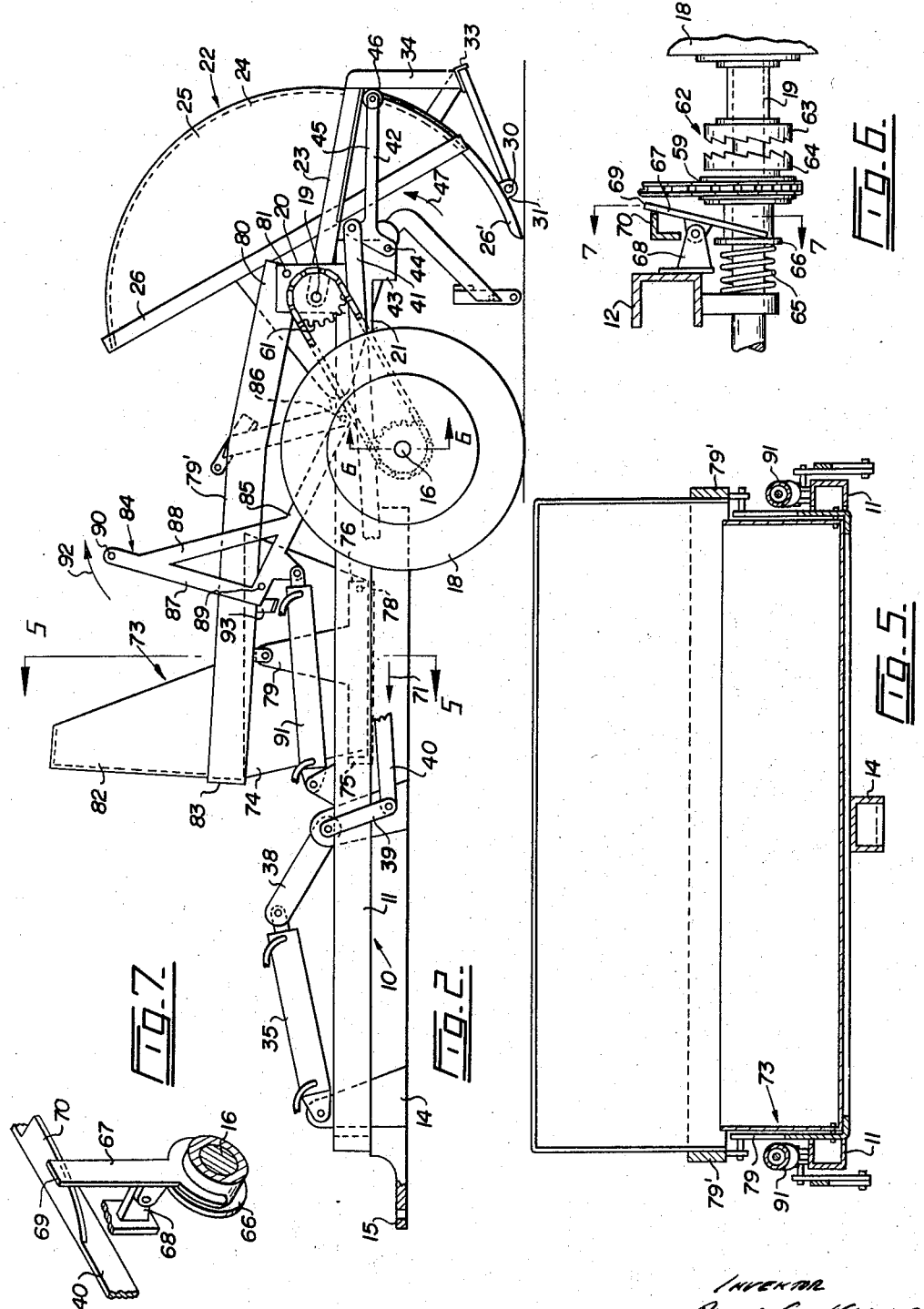

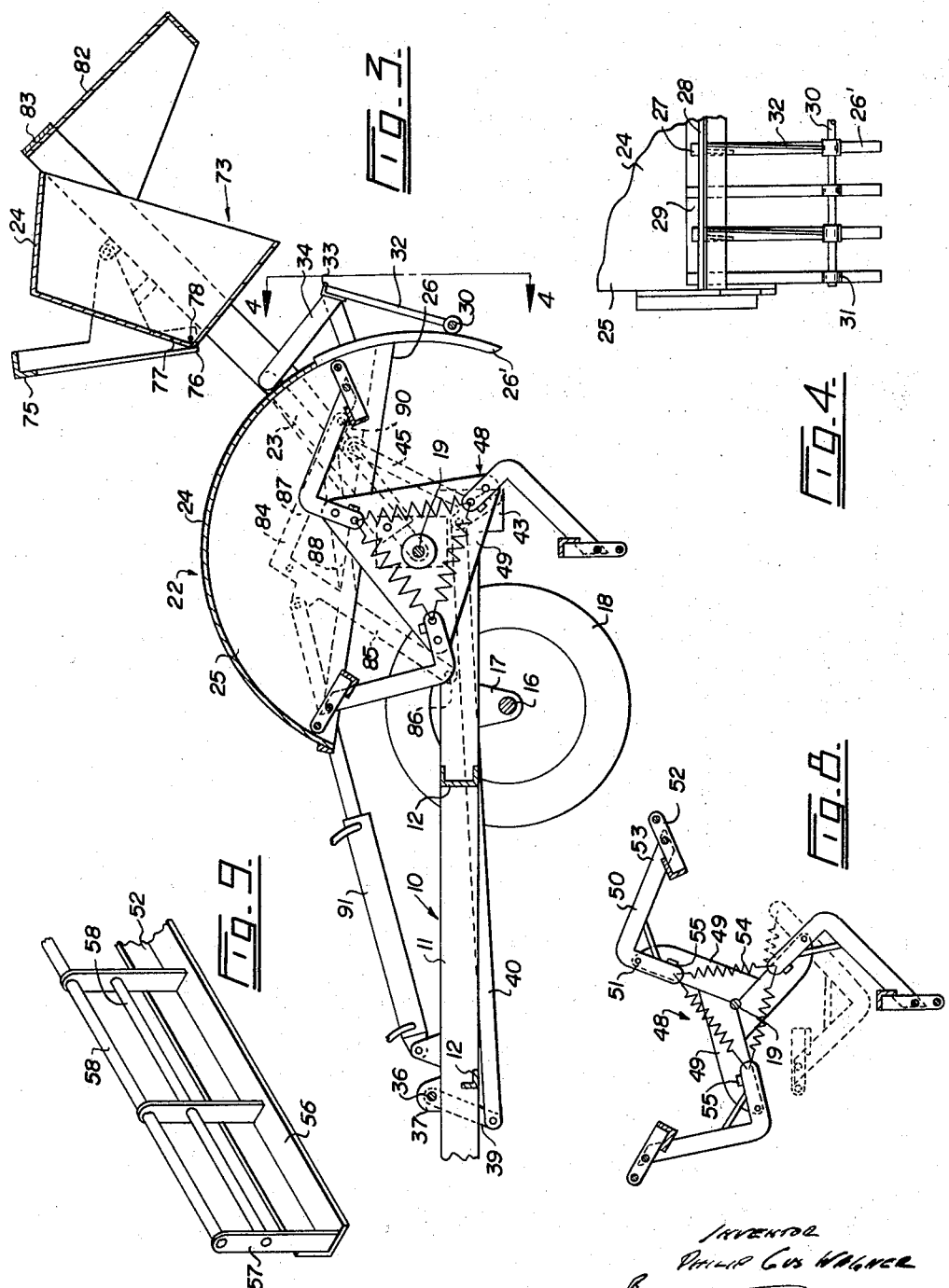

3,312,287
Patented Apr. 4, 1967

3,312,287
REEL TYPE STONE PICKER
Philip Gus Wagner, Earl Grey, Saskatchewan, Canada
Filed Aug. 27, 1964, Ser. No. 392,570
5 Claims. (Cl. 171—63)

My invention relates to new and useful improvements in stone picking devices particularly adapted to be towed behind a source of power such as a tractor. However although the device hereinafter to be described is adapted for use with a tractor, nevertheless it will be appreciated that similar structure can be used with a self-propelled stone picking device if desired.

The principal object and essence of my device is to provide a stone picking device of the character hereinwithin described which enables stones to be raked or combed from the surface of the soil as the device is moved thereacross, and which includes means to transfer these stones to a collector box mounted on the framework, said collector box being adapted for moving to a stone dumping position rearwardly of the machine when it is desired to dump the stones within said box.

Another object of the invention is to provide a device of the character herewithin described which includes a reel type device for transferring stones from the comb to the box and which includes shock absorbing means so that damage does not occur to the reel if a partially buried stone is encountered.

Another object of the invention is to provide a device of the character herewithin described which includes novel stone box tipping means when the stone box is in the dumping position.

A still further object of the invention is to provide a device of the character herewithin described which includes means to disengage the drive from the wheels to the reel when the comb is lifted clear of the ground for transporting purposes.

Yet another object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a top plan view of my device.

FIGURE 2 is a side elevation of the device shown in the stone collecting position.

FIGURE 3 is a partial view similar to FIGURE 2 but showing the device in the stone dumping position, and taken substantially along the line 3—3 of FIGURE 1.

FIGURE 4 is a partial end view along the line 4—4 of FIGURE 3.

FIGURE 5 is a transverse section substantially along the line 5—5 of FIGURE 2.

FIGURE 6 is an enlarged fragmentary sectional view of the clutch mechanism substantially along the line 6—6 of FIGURE 2.

FIGURE 7 is a partial isometric view substantially along the line 7—7 of FIGURE 6.

FIGURE 8 is a side view partially sectioned of the reel assembly per se.

FIGURE 9 is a fragmentary isometric view of one of the stone sweeps.

In the drawings like characters of reference indicate corresponding parts in the different figures.

Proceeding therefore to describe my invention in detail, reference to the accompanying drawings will show a general supporting framework collectively designated 10 including a pair of spaced and parallel longitudinal frame members 11 braced by cross channel members 12 and including a pair of forwardly converging side members 13 which are attached to a central tongue 14. The tongue extends rearwardly and is secured to the aforementioned members 12 and is also provided with a front extension 15 by which the device may be secured to a convenient source of power such as a tractor (not illustrated).

Also mounted on the tractor and not illustrated is a hydraulic pump assembly supplying a source of fluid power to the device as will hereinafter be described.

A wheel axle 16 is journalled between downwardly depending lugs 17 adjacent the rear ends of the longitudinal frame members 11, said wheel axle carrying a pair of wheels 18 journalled for rotation thereon. A spindle 19 is journalled for rotation between a pair of upstanding brackets 20 situated one upon each of the rear ends 21 of the longitudinal members 11.

A comb element collectively designated 22 is pivotally mounted for partial rotation around spindle 19, side supports 23 being journalled by one end thereof to each end of the spindle 19. These side supports carry a curved shield 24 having side plates 25 and edge supports 26.

Formed as a lower extension of this shield 24 is a plurality of spaced and parallel resilient fingers 26' secured by the upper ends 27 thereof to a transverse rod 28 extending across the lower edge 29 of the shield and the side elevation of these fingers is curved complementary to the curvature of the shield 24 as clearly shown in FIGURES 2 and 3.

Intermediate the ends of the fingers is a further transverse cross bar or rod 30 and the fingers are journalled upon this rod by means of lugs 31 thus permitting limited sideways movement of the fingers upon this rod 30.

However, the fingers are maintained in the normal spaced and parallel relationship one with the other by means of a resilient strip 32 extending between the off-standing cross member 33 and the fingers 26' adjacent the points of attachment of the fingers to the cross bar or rod 30. This permits stones which are too small to be picked up by the combs, to pass between the fingers by urging the fingers apart against the resiliency of the strips 32 which then return the fingers to the spaced and parallel position after the stone has passed therethrough.

Reference to FIGURE 2 shows the cross member 30 which is braced to the carrying arms 23 by means of a plurality of braces 34.

The comb element 22 is movable from the position shown in FIGURE 2 to the position shown in FIGURE 3 by means of hydraulic piston and cylinder assemblies 35 mounted within the framework adjacent the forward end thereof upon the aforementioned tongue 14.

A cross shaft 36 is journalled for rotation within upstanding lugs 37 and links 38 extend from the piston and cylinder assembly 35 and are secured to this rod 36 so that extension and contraction of the piston and cylinder assembly 35 rotates the rod 36 in one direction or the other.

Upon the ends of the rod are provided links 39 to which are attached rearwardly extending links 40 one upon each side of the framework thereof. The other ends 41 of the links 40 are pivotally secured to actuators 42 which consist of substantially T-shaped members pivotally secured to brackets 43 by one arm thereof upon pivot pins 44 shown in FIGURE 2.

Upon the extremities of the main portions 45 of these actuators I have provided a roller 46 engageable upon the aforementioned mounting arms 23 of the comb element 22.

When the piston and cylinder assembly is in the position shown in FIGURE 2, the comb element is in the ground engaging or rock collecting position. However, when the piston and cylinder assembly 35 is extended, the actuators are rotated around pivots 44 in the direction of arrow 47 (see FIGURE 2) thus rotating the comb elements 22 around shaft 19 to the position shown in FIGURE 3, the rollers 46 moving along the underside of the mounting brackets 23.

Also mounted upon shaft 19 is a reel collectively designated 48, said reel comprising, in this embodiment, three radially extending arms 49 secured to the ends of the spindle 19 and extending therefrom.

Pivotally secured to the outer ends 49 of these arms are angulated sweep carrying crank arms 50 mounted intermediate the ends thereof by means of pivot pins 51 as clearly shown in FIGURE 8.

Sweep elements 52 extend between the outer ends 53 of the crank arms 50 across the reel and parallel to the spindle 19 and tension springs 54 extend between the inner ends 55 of the crank arms upon each side of the device as clearly shown in FIGURE 8, normally maintaining the sweeps in the extended position and against stops 55 situated upon the aforementioned arms 49.

However if an obstruction is engaged by the sweeps 52, the arms may pivot around pivot points 51 to the position shown in phantom in FIGURE 8 thus permitting the sweeps to clear the obstruction without damage occurring thereto.

The construction of the sweeps is shown in detail in FIGURE 9 and consists of an angle iron 56 having a plurality of struts 57 secured thereto and extending therefrom.

These struts carry a pair of rods 58 in spaced and parallel relationship one with the other which engage the stones or rocks upon the surface of the ground and move them into the comb element 22.

A source of power is required to rotate the reel and this is provided from the ground engaging wheels 18 which rotate the axle 16 upon which they are mounted.

A sprocket 59 is secured to this axle and a chain 60 extends around this sprocket and around a further sprocket 61 secured to one end of the shaft 19 upon which the reel is mounted.

It is desirable to disengage the drive for the reel when the comb element 22 is elevated to the position shown in FIGURE 3 and in this connection I have provided an automatic clutch device collectively designated 62 and shown in FIGURES 6 and 7.

I provide a dog clutch one half 63 of which is secured to shaft 19, the other half 64 of which is secured to sprocket 59 which is journalled freely upon shaft 19.

A spring 65 bearing against the bearing 66 carrying the portion 64 of the clutch, normally maintains the two clutch components in engagement one with the other.

However, I provide a pivoted fork component 67 pivoted to a bracket 68, the upper end 69 of said fork being engageable by a cam surface 70 situated upon the link 41 controlling the elevation of the comb element 22 so that when this link is moved in the direction of arrow 71, the cam 70 bears against the upper end 69 of the fork 67 and forces the clutch elements apart against pressure of spring 65 thus disconnecting the drive to the reel.

The reel which revolves in the direction of arrow 72 transfers rocks from the comb element 22 to a stone collector box collectively designated 73.

The assembly 73 comprises a substantially rectangular type box 74 carried within a cradle 75. The box is pivoted to the front end 76 of the cradle by one front side 77 thereof, upon pin 78.

The cradle includes side lugs 79 which extend upwardly and are pivotally secured to a pair of spaced and parallel box supports 79' pivotally secured by the rear end 80 thereof to the aforementioned lugs 20 by means of pivot pin or rod 81.

A box shield 82 is secured to the opposite end 83 of the box supports 79' and extends upwardly therefrom as shown in FIGURE 2 so that the reel 48 transfers stones from the comb element 22 and throws them into the box 74, the shield 82 assisting in the deposition of the stones within the box.

I have provided a pair of box arm movement controlling links collectively designated 84 one upon each side of the supporting framework, said links comprising a major portion 85 pivotally secured to the frame to pivot pins 86.

Upper portions 87 are provided substantially at right angles to the major portions 85 and are braced by diagonals 88. The upper portions 87 comprise a pair of spaced and parallel plates between which the box arm supports 79' may move from restraining rod 89 at one end of the links 87 to restraining rod 90 situated at the other ends of the links 87.

A hydraulic piston and cylinder assembly 91 is situated upon each side of the supporting framework and extends between the framework and the links 85 as clearly shown in FIGURE 2.

Both the hydraulic piston and cylinder assembly 35 and the assemblies 91 are connected by hose to the aforementioned source of hydraulic pressure mounted upon the tractor.

When in the position shown in FIGURE 2, stones are receivable within the box. However, when it is desired to dump the stones, the hydraulic piston and cylinder assemblies 91 are extended which moves the links 85 in an arc in the direction of arrow 92 pivoting around pivot pin 96. The box carrying arms 79' are at this time resting upon the restraining rod 89 and are moved upwardly in a similar direction to arrow 92 pivoting around pivot pins 81.

The cradle 75 together with the stone box 74, due to the pivotal attachment of the cradle to the box arms, maintains horizontal position until the carrying arms 79' are substantially vertical whereupon the cradle lugs 79 engage stops 93 secured to the box carrying arms 79'. This causes the cradle together with the arms to tilt and as the box carrying arms 79' reach the vertical position and go over center, the weight of the box causes the box and the arms to fall by gravity from the restraining rod 89 to restraining rod 90, it being stopped suddenly upon engagement with the restraining rod 90 which flips the bucket around the pivot 78 to the dumped position shown in FIGURE 3, with the bucket or box 74 extended from the cradle 75.

After the stones have been dumped from the box, the piston and cylinder assemblies 91 are retracted thus returning the device to the position shown in FIGURE 2.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a reel type stone picker, the combination of a frame, rotatable ground engaging wheel means provided on said frame, a transverse shaft rotatably journalled in the frame, a comb assembly swingably mounted on said shaft for raising and lowering movement independent of the shaft rotation, said comb assembly including a set of stone gathering teeth disposed in an operative position at ground level when said comb assembly is lowered and spaced substantially above the ground when the comb assembly is raised for transport, a stone receptacle provided on the frame, a stone transferring reel rotatable with said shaft for delivering stones from said comb assembly into said receptacle, means for raising and lowering said comb assembly, drive means between said ground engaging wheel means and said shaft for rotating said reel by rotation of the wheel means, and means automatically responsive to raising of said comb assembly for interrupting said drive means when the comb assembly is raised.

2. The device as defined in claim 1 wherein said comb assembly raising and lowering means include a movable actuating link operatively connected to the comb assembly, said drive means including a clutch, and said drive interrupting means including clutching and de-clutching means for said clutch actuated by movement of said link.

3. The device as defined in claim 1 together with means mounting said stone receptacle on said frame for swinging movement between a lowered stone receiving position and a raised stone dumping position, and means responsive to movement of said mounting means for automatically dumping said receptacle in its raised position.

4. In a reel type stone picker, the combination of a wheeled frame, a stone gathering comb assembly provided on said frame, a stone receptacle, a rotating stone transferring reel provided on the frame for delivering stones from said comb assembly into said receptacle, means for mounting said receptacle on said frame for swinging movement between a lowered stone receiving position and a raised stone dumping position, said mounting means including a pair of transversely spaced arms pivoted at one end thereof to the frame for vertical swinging movement, a cradle pivotally suspended from the other end portions of said arms, said cradle normally seeking a horizontal position by gravity, said receptacle being pivotally connected at one side thereof to one side of said cradle, means for vertically swinging said arms, and abutment means provided on said arms, said abutment means being engageable with said cradle in the raised position of the arms, whereby to tilt the cradle from its horizontal position and permit said receptacle to be pivotally dumped on the tilted cradle.

5. The device as defined in claim 4 wherein said means for swinging said arms include a pair of transversely spaced control levers pivoted to said frame and disposed exteriorly at the sides of said arms, and first and second spaced parallel cross bars extending between said levers respectively below and above the arms, said arms resting on the first cross bar in their lowered position and being raised by the first cross bar when said levers are actuated, and the spacing of the cross bars relative to said arms being such that when the arms are raised to top center and said levers are held stationary, the arms are movable past top center to impact against the second cross bar and thereby cause said receptacle to be pivotally dumped on the tilted cradle by the impact.

References Cited by the Examiner

UNITED STATES PATENTS 2,141,557   12/1938   Reiter    171—85
3,151,682   10/1964   Bussiere    171—63

ABRAHAM G. STONE, *Primary Examiner.*

ANTONIO F. GUIDA, *Examiner.*